(12) United States Patent
Briggs et al.

(10) Patent No.: US 6,383,394 B1
(45) Date of Patent: May 7, 2002

(54) RECYCLING PROCESS AND APPARATUS

(76) Inventors: David L. Briggs, 8543 Framewood Dr., Newburgh, IN (US) 47630; John K. Clement, Jr., 3472 Brookside Rd., Toledo, OH (US) 43606

(*) Notice: Subject to any disclaimer, the term of this patent is extended or adjusted under 35 U.S.C. 154(b) by 0 days.

(21) Appl. No.: 09/881,497

(22) Filed: Jun. 14, 2001

Related U.S. Application Data

(60) Continuation-in-part of application No. 09/660,607, filed on Sep. 13, 2000, which is a division of application No. 09/014,300, filed on Jan. 27, 1998, now Pat. No. 6,143,170.

(51) Int. Cl.$^7$ ............................................. B01D 41/02
(52) U.S. Cl. ...................... 210/671; 210/675; 210/691; 210/781; 210/241; 210/360.1; 134/33; 34/322
(58) Field of Search ................................. 210/670, 671, 210/675, 673, 680, 691, 781, 787, 924, 502.1, 210, 179, 241, 360.1; 134/10, 33, 105, 107; 34/321, 322, 333, 318

(56) References Cited

U.S. PATENT DOCUMENTS

| | | | |
|---|---|---|---|
| 2,198,412 A | * | 4/1940 | McDonald |
| 2,727,629 A | | 12/1955 | Hertrich |
| 3,356,218 A | | 12/1967 | Grudoski |
| 3,679,058 A | | 7/1972 | Smith |
| 3,688,906 A | | 9/1972 | Ferrara |
| 3,827,985 A | | 8/1974 | De Haan et al. |
| 3,962,083 A | | 6/1976 | Goldman |
| 4,120,788 A | | 10/1978 | Ellis |
| 4,157,781 A | | 6/1979 | Maruyama |
| 4,277,569 A | | 7/1981 | Walker |
| 4,356,275 A | | 10/1982 | Wagner et al. |
| 4,395,332 A | | 7/1983 | Klein |
| 4,395,336 A | | 7/1983 | Eng |
| 4,416,782 A | | 11/1983 | Kerres |
| 4,454,044 A | | 6/1984 | Klein |
| 4,636,317 A | | 1/1987 | Lewis |
| 4,664,812 A | | 5/1987 | Klein |
| 4,919,646 A | | 4/1990 | Perdriat |
| 5,156,743 A | | 10/1992 | Muncrief |
| 5,165,821 A | | 11/1992 | Fischer et al. |
| 5,192,455 A | | 3/1993 | Marcel, Jr. |
| 5,227,072 A | | 7/1993 | Brinkley |
| 5,229,006 A | | 7/1993 | Brinkley |
| 5,232,607 A | | 8/1993 | Lundquist |
| 5,403,478 A | | 4/1995 | Brinkley |
| 5,407,575 A | | 4/1995 | Vinsonhaler |
| 5,423,985 A | | 6/1995 | Addeo et al. |
| 5,484,683 A | * | 1/1996 | Morgan ...................... 34/322 |
| 5,514,286 A | | 5/1996 | Crosby |
| 5,643,449 A | | 7/1997 | Brinkley |
| 5,700,558 A | | 12/1997 | Bopp |

FOREIGN PATENT DOCUMENTS

NL 9001198 12/1991

OTHER PUBLICATIONS

Advertising brochure entitled "Food Processing Products", 6 pages., Bock Engineered Products, Inc., Toledo, OH (published before 1995).

* cited by examiner

Primary Examiner—Duane Smith
Assistant Examiner—Frank M. Lawrence
(74) Attorney, Agent, or Firm—Luedeka, Neely & Graham PC

(57) ABSTRACT

The invention relates to a method for rendering waste sorbent material recyclable. The method includes collecting polymer-based sorbent materials containing one or more solvents, treating the waste material in a centrifugal treatment system for removing the solvents from the polymer-based sorbent materials whereby the sorbent materials have a residual solvent content that renders the materials non-hazardous for transportation to a remote recycling site. The treatment system includes a fume collection system and a centrifuge disposed in the fume collection system. The sorbent materials are charged into the centrifuge and the centrifuge is operated for extractive removal of solvents therefrom and collection of the extracted solvents. The sorbent materials are rendered non-hazardous by the centrifugal treatment system enabling the materials to be taken off site for use in making recycled parts.

14 Claims, 4 Drawing Sheets

RECYCLING PROCESS AND APPARATUS

RECYCLING PROCESS AND APPARATUS

This application is a continuation-in-part of application Ser. No. 09/660,607 filed Sep. 13, 2000, now pending, which is a division of application Ser. No. 09/014,300 filed Jan. 27, 1998, now U.S. Pat. No. 6,143,170 entitled "Oil Recovery System."

FIELD OF THE INVENTION

The invention relates generally to recovery of raw materials from recycled hazardous products and to apparatus for cleaning and reclaiming raw materials from hazardous products.

BACKGROUND OF THE INVENTION

With regard to environmental protection, many state and Federal regulations allow recycling hazardous waste materials on-site. The waste material must remain on-site until it can be classified as non-hazardous. At that point, the material may be disposed of by a variety of means such as landfilling, burning and the like. Landfilling or burning such materials is expensive and a waste of valuable raw materials. Some waste materials are adaptable to being recycled, however, even if the hazardous characteristics of the material are removed, some states still classify the material as a waste material rather than a used, reused or reclaimed material. There is a need for novel methods for handling waste materials and waste products to minimize environmental problems associated with the waste materials and to maximize the benefits obtained by reusing the materials.

SUMMARY OF THE INVENTION

With regard to the foregoing and other objects and advantages, the invention provides a method for recovering organic fluids from sorbent articles to render the articles reusable. The method includes the steps of providing reusable sorbent articles, exposing the sorbent articles to organic fluids for absorption of the fluids by the sorbent articles. A system for treating the thus exposed sorbent articles is provided, the system including a motor vehicle containing a power supply and a self-balancing centrifuge having a housing and connected to the power supply for powered operation thereof. The centrifuge is positioned on the vehicle for transport to a remote site containing the reusable the sorbent articles. The centrifuge includes a housing cover and a rotatable basket received within an interior portion of the centrifuge defined by the housing and cover and configured for receiving a plurality of the sorbent articles. The exposed sorbent articles are charged into the centrifuge and the centrifuge is operated to rotate the basket to apply centrifugal forces to the sorbent articles for extractive removal of organic fluids therefrom such that the fluids travel from the basket into an annular area between the basket and the housing, A collection tank is provided in flow communication with the annular area for receiving the fluids removed from the sorbent articles. After collecting the removed fluids in the collection tank the thus treated sorbent articles are removed from the centrifuge.

In another aspect the invention provides a method for rendering waste sorbent material recyclable. The method includes collecting polymer-based sorbent materials containing one or more solvents and treating the sorbent materials in a centrifugal treatment system for removing the solvents from the polymer-based waste material. The treatment system includes a fume collection system and a centrifuge disposed in the fume collection system. The centrifuge has a housing, a housing cover and a rotatable basket received within an interior portion of the centrifuge defined by the housing and cover. The rotatable basket is configured for receiving a plurality polymer-based sorbent materials containing one or more solvents. The sorbent articles are charged into the centrifuge and the centrifuge is operated to rotate the basket to apply centrifugal forces to the sorbent articles for extractive removal of solvents therefrom such that the fluids travel from the basket into an annular area between the basket and the housing. A collection tank is provided in flow communication with the annular area for receiving solvents removed from the sorbent materials. The thus treated sorbent materials are moved from the centrifuge for transportation to a remote site for recycling. Use of the system provides sorbent materials having a residual solvent content that renders the materials non-hazardous for transportation to a remote recycling site.

An important aspect of the invention is the mobility of the system which provides on-site recovery of organic fluids and reconditioning of sorbent materials in an efficient and effective manner. The system thus reduces the need to transport relatively large numbers of drums or other receptacles filled with sorbent materials containing organic fluids which may be classified as hazardous to a remote location for treatment or reconditioning For example, since the service provider comes to the site, the user need not inventory the sorbent materials as a hazardous waste, despite the hazardous characteristics of the sorbent materials, since the organic fluids in the sorbent materials which give then their hazardous characteristics are removed before the sorbent materials leave the site where the sorbent materials are used and collected for disposal. Also, as the service provider is able to use the system at multiple sites, considerable economies of scale may be achieved and the plant owner need not invest substantial sums of money in equipment to accomplish a task which a service provider may more economically provide. Another benefit to the system is that it enables thermoplastic sorbent materials to be treated in a manner so that the materials may be used as a raw material in a thermoplastic formulation.

BRIEF DESCRIPTION OF THE DRAWINGS

The above and other features and advantages of the present invention will become further known from the following detailed description considered in conjunction with the accompanying drawings in which.

DETAILED DESCRIPTION

Figure 1:
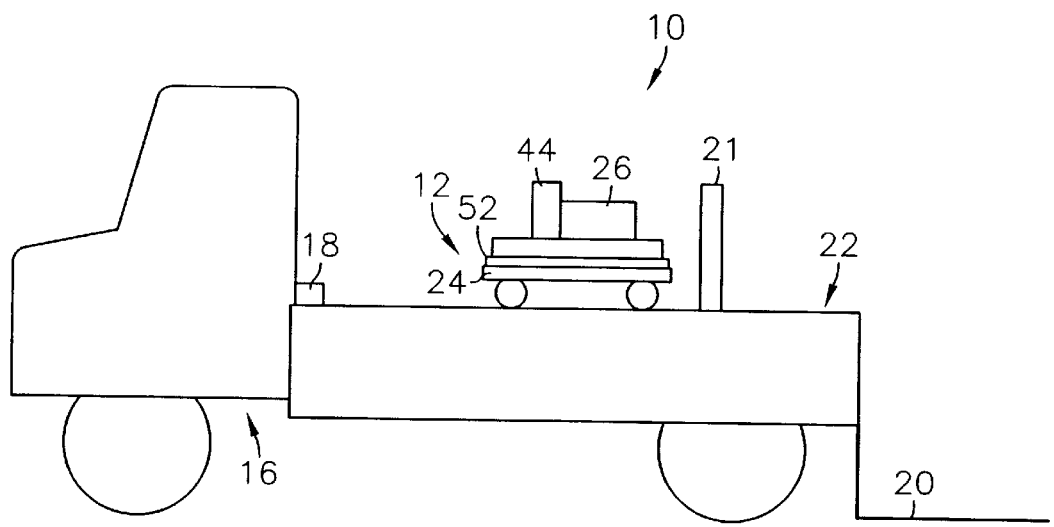
FIG. 1 is a left-side elevational view of a system for recovering organic fluids in accordance with the invention.
Figure 2:
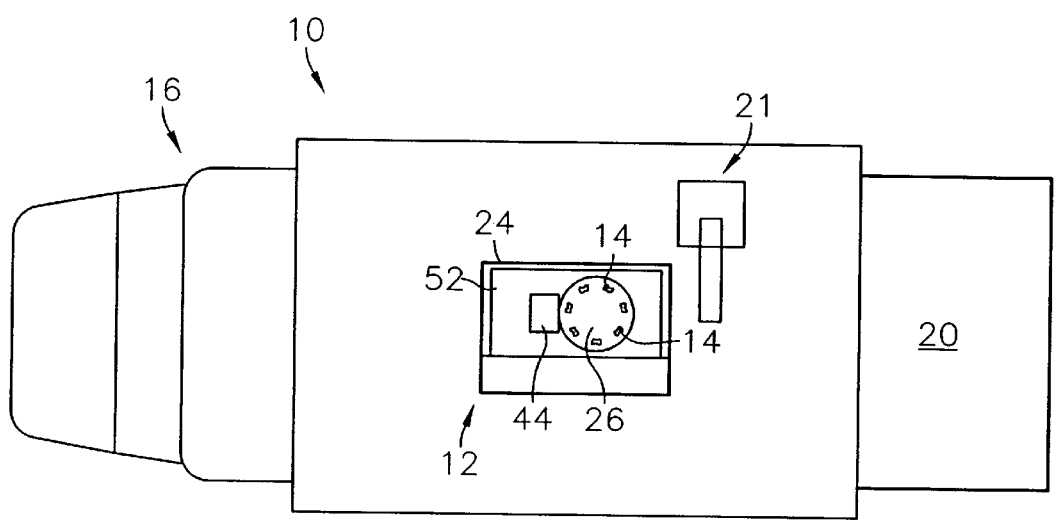
FIG. 2 is a top plan view of the system of FIG. 1.

With initial reference to FIGS. 1 and 2, there is shown a system 10 for recovering organic fluids in accordance with the invention. The system 10 includes separation apparatus 12 for removing liquids from absorbent articles or pads 14 loaded into the separation apparatus 12. A vehicle 16 is provided in conjunction with the apparatus 12 to enable the separation apparatus to be transported to various sites for treatment of pads 14 containing absorbed liquids to remove liquids, primarily organic fluids, from the pads and to recover the removed fluids. The vehicle 16 is preferably a self-propelled motor vehicle having an internal combustion or electric engine. Optionally, the vehicle may be provided as by a trailer which may be pulled by a tractor or truck or the like, or by a boat or a barge should the system be used in connection with a water spill. The vehicle 16 also contains a power source or generator 18 for providing power to run the separation apparatus 12. Alternatively, the generator 18, particularly if self-powered, may be mounted to the separation apparatus 12. The generator 18 may also be connected to a power source for vehicle 16 such as an alternator connected to the engine for the vehicle. As will be appreciated, the generator 18 is preferably constructed so as to avoid sparks and the like particularly if the organic fluid in the pads 14 is flammable. The vehicle also preferably includes a powered lift gate 20 for lifting drums and an optional drum dumper 21 for dumping pads 14 contained in the drums into the separation apparatus 12 for removal of fluids therefrom. The lift gate 20 may be used to lift drums to a bed 22 of the vehicle or for removing the separation apparatus 12 from the vehicle 16 if desired. For example, if the separation apparatus is provided on a wheeled cart 24, the lift gate 20 facilitates removal of the cart from the vehicle 16 and subsequent loading of the cart back onto the vehicle 16. The drum dumper 21 is preferably a motor driven unit having a support for receiving a drum and positioning the drum for dumping pads contained therein into the separation apparatus 12.

As used herein, the term "organic" refers to and includes hydrocarbon fluids, and primarily liquid-phase hydrocarbons such as crude oil and derivatives thereof, such as motor oil, lubricating oil, hydraulic fluids, transmission fluids, gasoline, diesel and the like. Other organic materials include, but are not limited to alcohols, naphtha, aromatic solvents and the like.

The separation apparatus 12 functions to separate fluids from the pads 14, primarily organic liquids and small amounts of water, and is preferably provided as by a wringer or, most preferably a centrifuge 26. The centrifuge 26 is preferably an electrically operated stainless steel, explosion proof, self-balancing centrifuge which may be operated at rotational speeds of from about 500 to about 2,500 RPM. The preferred rotational speed is from about 1500 to about 2,200 rpm providing a G-force of up to about 2060 G's. Such a centrifuge having a diameter of from about 20 to about 30 inches and a basket depth of from about 10 to about 20 inches, and is available from Bock Engineered Products, Inc. of Toledo, Ohio.

Figure 3:
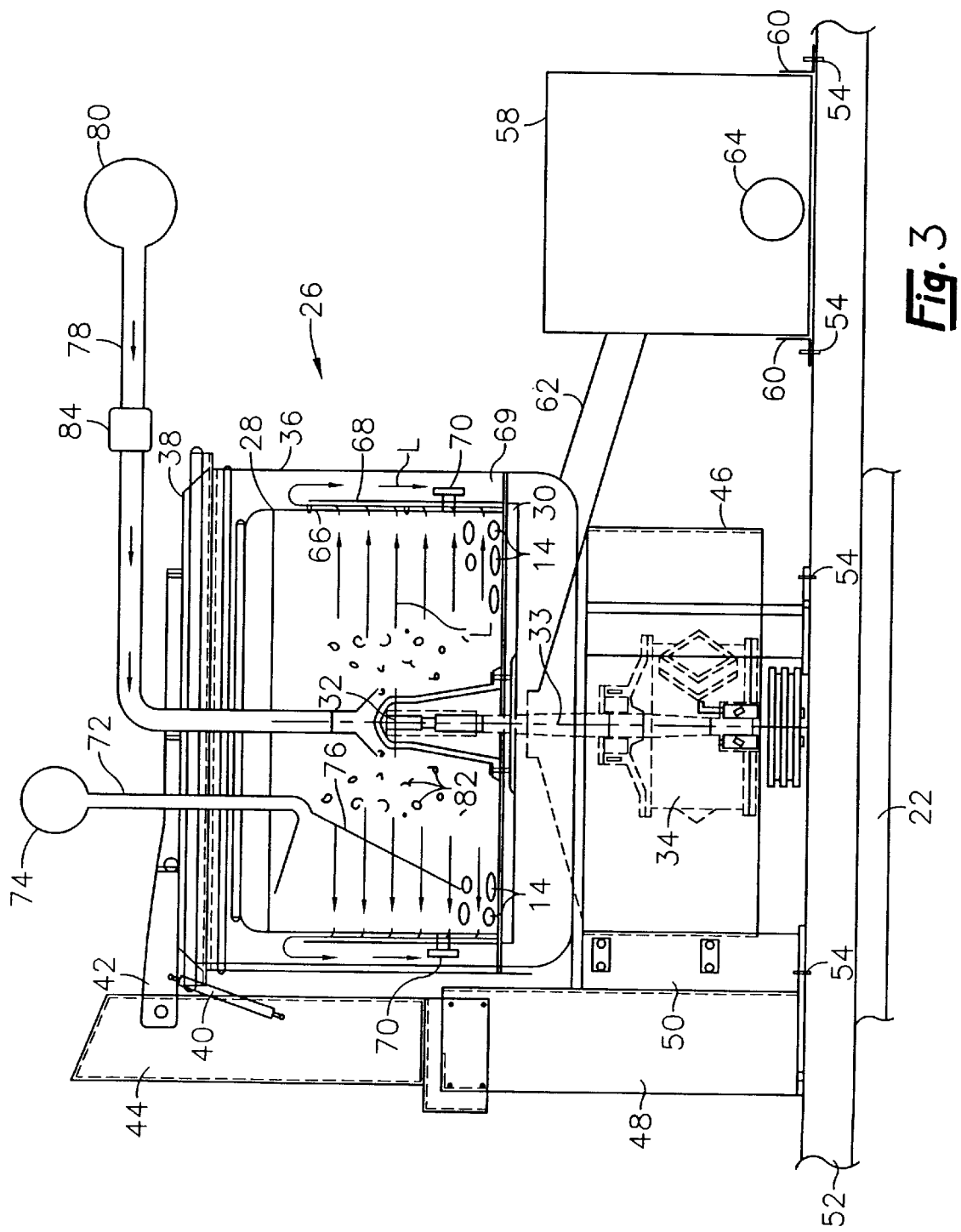
FIG. 3 is a side cross-sectional view of a centrifuge for use in the system of FIG. 1.

The centrifuge 26, as configured in accordance with the invention and shown in detail in FIG. 3, includes a foraminous basket preferably a double walled basket 28 having a solid bottom 30 mounted on a hexagonal ball and socket joint 32 at the upper end of shaft 33. The shaft 33 is associated with a drive unit 34 for spinning the shaft 32 and thus the basket 28 to apply centrifugal forces to pads 14 loaded into the basket 28. The basket 28 spins within a bowl-shaped housing 36 having a removable cover or lid 38 provided to seal the opening of the housing 36 and to cover the basket 28 during operation of the centrifuge 26 so that fluids removed from the pads 14 remain in the centrifuge. The lid 38 is preferably hinged and selectively openable as by gas springs 40 which extend between support arms 42 and a support column 44 to which the arms 42 are pivotally mounted. A protective metal housing 46 is preferably provided around the drive unit 34.

A power distribution unit 48 and control box 50 are associated with the drive unit 34 for providing electrical power to the drive unit and for controlling operation of the centrifuge. The centrifuge 26 is preferably mounted to a skid 52 which is mounted, as by fasteners such as bolts 54, to skid 52 or to the wheeled cart 24 (FIG. 1) which may be secured, as by chains, to the bed 22 of the vehicle during transport of the system from site to site.

A tank 58 is preferably provided for recovering fluids removed from the pads 14 during operation of the centrifuge. The tank 58 is preferably also mounted to the skid 52, such as by bolts 54 and L-shaped supports 60, and is in flow communication with the housing 36 as by conduit 62. The tank 58 may be drained as by a valved conduit 64 for recovery of the fluids for reuse or recycling thereof. In this regard, the fluid may be further treated, as by a skimmer, for separating the organic fluids from any water which may be recovered with the fluid.

As mentioned above, the basket 28 is preferably a double-walled basket having foraminous inner sidewalls 66 surrounded by a substantially solid outer sidewall 68. The outer sidewall 68 is preferably sealed against fluid flow by solid bottom 30 and has an opened upper end along the upper circumference thereof.

The double walled design advantageously enables the basket 28 to be charged with a solvent or washing liquid for enhanced cleaning of the pads. As will be appreciated, as the basket starts to spin, centrifugal forces cause the liquids to pass through the foraminous sidewall 66 into the annular area between the foraminous sidewall 66 and the solid outer sidewall 68 so that the fluid as shown by the arrows L flows over the opened upper end of sidewall 68 and into annular space 69 between the basket 28 and the housing 36. Handles or lifting lugs 70 may be provided on the outer surface of the sidewall 68 to aid in removing the basket from the housing 36.

To facilitate removal of organic fluids from the pads 14, it is preferred to introduce heat, a wash/rinse solution and/or air into the centrifuge. For example, a conduit 72 in flow communication with a source of a rinse/wash solution 74, such as water, preferably extends through the lid 38 for introducing a pressurized spray 76 of the rinse solution into the basket for rinsing of the pads. Suitable rinse/wash solutions include but are not limited to, detergent solutions, solvents and water.

The centrifuge 26 may be charged with a washing/rinse liquid for enhanced cleaning of the pads after removal of the bulk of the organic fluid from the pads by action of the centrifuge alone. If subsequently charged with such a solution, it is preferred to agitate the solution and pads to release solids and particulates from the pads. Accordingly, there is preferably provided a conduit 78 in flow communication with a source of pressurized gas 80, such as air, which extends centrally through the lid 38 to introduce a stream of gas bubbles 82 into the centrifuge for agitating the pads 14. For a centrifuge having a diameter of from about 20 to about 30 inches (i.e. from about 15 to about 49 gallons capacity), the spray is preferably introduced at a rate of from about 5 to about 10 gallons/min for a period of from about 3 to about 5 mins, and the gas stream is preferably introduced at a rate of from about 30 to about 50 cubic feet per minute (cfm) for a period of from about 3 to about 5 mins.

If desired, the gas introduced via the conduit 78 may be heated to a temperature of from about 30 to about 50° C. as by in-line heater 84 to raise the temperature of any liquid in the centrifuge 26 and/or to heat the pads 14 in order to decrease the viscosity of the organic fluids and thereby facilitate separation of the fluids from the pads 14. Cooling gas may also be introduced into the centrifuge via conduit 78 to cool the liquids and/or pads after treating the pads to remove organic fluids therefrom.

The pads 14 are typically reusable and may be used to contain and clean-up organic fluid leaks and drips from floor surfaces, such as around machinery, and from water. The pads 14 may be provided in various shapes including, but not limited to, pads, mops, eels, socks and ribbons. The separation apparatus functions to separate liquids and particulate matter from the pads 14 and enables recovery of the liquids removed from the pads 14 so that the liquid may be collected and the pads rendered so that they are suitable for reuse to absorb additional liquids.

A preferred pad 14 for absorbing organic fluids such as oil is available from Hydrocarbon Recovery Products, Inc. of Newburgh, Indiana and is illustrated. Such pads are described in U.S. Pat. No. 5,227,072, entitled METHOD OF RECOVERING HYDROCARBON-BASED FLUID and U.S. Pat. No. 5,229,006, entitled METHOD OF RECOVERING HYDROCARBON-BASED FLUIDS AND APPARATUS incorporated herein by reference as if fully set forth. Other suitable pads include those described in U.S. Pat. No. 5,407,575, entitled OIL SPILL CLEANUP AND RECOVERY SYSTEM, and U.S. Pat. No. 5,403,478, entitled HYDROCARBON-BASED FLUID ABSORBENT ARTICLE, incorporated herein by reference as if fully set forth.

Figure 4:
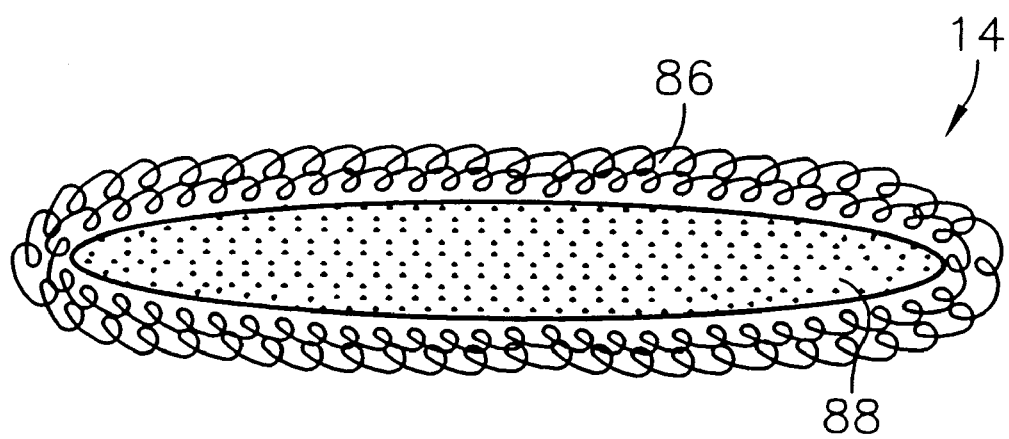
FIG. 4 is a sorbent material which may be recycled according to the invention.

With reference to FIG. 4, such pads typically have at least one polymeric outer covering 86, e.g., polypropylene, polyester, nylon having an affinity for hydrocarbonous compounds, and an inner core 88 made of a solid foam material such as polyethylene, polypropylene and polyurethane. The foam material may be in the form of a block or pad of foam or may be granular foam particles. The outer covering 86 may be provided on one or both sides of foam inner core 88 as by the use of adhesives between the outer cover 86 and foam core 88. A preferred outer covering 86 is a nonwoven web of intertwined polymeric fibers which provide voids sufficient to entrain organic fluids therein. The outer covering way thus be a random fibrous web, a napped web, a felted web or any other suitable web having sufficient voids for soaking up organic fluids. Such pads are substantially hydrophobic and lipophilic and thus absorb organic fluids to the substantial exclusion of aqueous fluids. Thus, the removal of fluids from the pads as described herein typically involves the removal of primarily organic fluids with minor amounts, generally less than about 5% by volume, of water.

The pads preferably have an organic fluid absorption capacity, based on the weight of organic fluid per weight of pad, ranging from about 10 to about 25 times the weight of the pads. Higher or lower capacity pads may also be used with the recovery system as described herein. Likewise, foam articles or fibrous articles alone may be used to soak up organic fluid spills provided these sorbent articles lend themselves to the reconditioning as described herein.

The pads 14 may be advantageously employed to collect organic fluids from around machinery and from locations such as the surface of water or land wherein such fluids may have spilled. For example, in an industrial plant, the pads may be placed at strategic locations around machinery, such as at the bases of machines that leak hydraulic fluid or in oil storage locations. After soaking up the organic fluids the pads are collected and treated using the system 10 described above to remove the absorbed organic fluid from the pads and thus recondition the pads for reuse. The removed fluid may be collected, such as in a tank, for re-use or recycling and the treated pads returned to their strategic locations for further absorption of leaked fluids.

As will be appreciated in this scenario, numerous sites may exist in a plant where organic fluids may leak and need to be recovered. Conventionally, the pads are collected in large drums or barrels, such as 55 gallon drums, and the drums taken, as by forklift or truck, to a treatment station that is generally remote from many of the sites. The present invention advantageously provides a mobile system which may be taken to a plant and to various locations within the plant site on a periodic basis to facilitate treatment of the pads and eliminate the need to transport the drums to a remote location. This offers considerable economy in that one individual may transport the system to the various sites and treat the pads. This advantageously avoids the considerably more man-power/time as is required to move multiple drums of pads to a remote treatment location.

A typical cleaning cycle may include the following steps. Pads 14 are collected from a spill or clean-up site and loaded into the basket 28 of centrifuge 26. After loading the pads 14 into the basket 28, a flow of air from source 80 is heated by in-line heater 84 to a temperature in the range of from about 30 to about 50° C. The flow of hot air is discontinued is and the centrifuge is operated for from about 5 to about 7 minutes at about 1750 rpm to remove the bulk of the hydrocarbon-base fluid L which flows by gravity through conduit 62 into tank 58.

Once the flow of fluid has ceased, a rinse liquid from source 74 is sprayed into the centrifuge through conduit 72. During the spraying step, it is preferred to operate the centrifuge to remove the sprayed liquid either to the same tank 58 or to a separate water recovery tank. Spraying of the pads may be conducted from about 3 to about 5 minutes.

At the end of the spraying cycle, or in lieu of the spraying cycle, the centrifuge may be filled with a cleaning or rinse liquid, preferably containing a suitable detergents or surfactants including, but not limited to, anionic surfactants such as sulphonated alkylbenzenes, carboxylates, acylated protein hydrolysates, sulfonates, sulfates, phosphate esters and the like, non-ionic surfactants such as ethoxylates, carboxylic acid esters, carboxylic amides, polyalkylene oxide block copolymers and the like and cationic surfactants such as quarternary ammonium salts, amines and imidazolines for removing particulates and dust from the pads.

In addition to or in lieu of the use of detergents and/or surfactants for cleaning the pads, various biological cleaners may also be used. Such biological cleaners are particularly useful for removing residual hydrocarbon sludges and solids from the pads after removing the bulk of hydrocarbon liquids from the pads. A preferred biological cleaner is a detergent containing polyethylene glycol p-tert-octylphenyl ether such as the product available from Premium Supply Company, Inc. of El Campo, Tex. under the tradename BUGS & SUDS NEUTRAL SURFACE.

For a single walled basket 28 having only a foraminous sidewall 66, conduit 62 or tank 58 may be equipped with a valve to maintain the fluid in the basket 28. Once the basket is filled with fluid, the pads and fluid may be agitated as by the introduction of air from air source 80 through conduit 78 into the centrifuge basket 28. The agitation may be conducted from about 3 to about 5 minutes.

After soaking the pads in a rinse fluid, the pads may be spun dry as by rotating the centrifuge basket at about 1750 rpm. Because solid bottom 30 is substantially more massive than the sidewalls 66 and 68 of the basket 28 and because the bottom rotates below the pivot point on shaft 32, any unbalance caused by maldistribution of pads 14 in the basket 28 is compensated for in a manner similar to the operation of a gyroscope. Accordingly, no special foundations are required for mounting the centrifuge. Hence, the portability of the centrifuge is enhanced.

It will be appreciated that the skid 52 may be configured to accommodate the centrifuge 26, tank 58, power source 48, control unit 50, conduits 72 and 78, rinse solution source 74 and air source 80 so that a completely self-contained cleaning system is provided. However, one or more of the components may be separately, mounted on adjacent skids for easier handling and operation of the recovery system.

The system 10 may be used in various ways to facilitate removal of fluids from pads 14. For example, the system 10 may be driven on a periodic basis to each site at a plant where pads are stored and the pads treated at each site by loading the drums into the separation apparatus 12 mounted on the vehicle and operating the apparatus to remove fluids. This is advantageous, as a single apparatus may be used to remove fluids from pads used at various sites while avoiding the laborious task of transporting the pads to a remote location for off-site treatment of the pads. In another manner, the separation apparatus 12 may be off-loaded at a site and left and thereafter picked up after reconditioning the pads 14 at the site.

As will be appreciated, the portability of the system significantly reduces the labor and associated costs involved as it is more economical and convenient to transport the centrifuge to a variety of locations than to transport numerous drums from multiple locations to a fixed position centrifuge.

In another embodiment, the invention provides a system for treating sorbent pads made of recyclable material so that the pads may be used as a component of raw material for making thermoplastic parts considered to be made from recycled materials. For a part to be considered made from a recycled material, at least 25% by weight of the raw material must be recycled or reclaimed from used material. "Recycling" means the waste material is a used material, a reused material or a reclaimed material. Federal and State regulations permit recycling of hazardous waste materials on-site provided the waste material does not leave the site of generation until the hazardous characteristics are removed.

The invention enables removal of organic components from the sorbent pads so that the pads may be treated as non-hazardous waste. For example, pre-saturated alcohol wipes made entirely of thermoplastic materials such as polypropylene or polyester are used by the automotive industry to prepare the metal on cars and trucks for painting. The sorbent materials used as wipes include materials made from varying grades of 100 percent by weight polypropylene and contain a organic fluid that ranges from about 80 wt. % to about 100 wt. % isopropyl alcohol, naphtha or other solvent and from about 0 wt. % to about 20 wt. % dionized water. Such sorbent materials are available from Contec Thunderbolt of Toledo, Ohio under the trade name PROSAT and from BBA Non-wovens of Peine, Germany under the trade name EVERSPUN. After using the wipes, the wipes are collected and must be treated or disposed of as hazardous waste. However, the system described below may be used to remove sufficient organic and/or flammable fluids from the wipes so that the wipes may be classified as non-hazardous.

For a material to be classified as non-hazardous, the material must pass the following tests:

1. The "free-liquids" test described in ASTM Method 9095.
2. The Paint Filter Liquids Test Method 9095A as described in the publication entitled "Test Methods of Evaluating Solid Waste, Physical/Chemical Methods, $3^{rd}$ Edition as amended by the Environmental Protection Agency (EPA), Office of Solid Waste and Emergency Response (OSWER), SW-846, Methods 1010 and 1020.
3. The flammability or ignitability test determined by a "Pensky-Martens Closed Cup Tester" using the test method specified in ASTM Standard D-93-79 or D-93-80, a "Setaflash Closed Cup Tester" using the test method specified in ASTM D-3278-78 or an equivalent test method authorized for use by the procedures set forth in 40 C.F.R. 2600.20 and 260.21.

The test used to determine the volatile organic content of the recyclable material is the Toxicity Characteristic Leaching Procedure (TCLP), test method SW 8260A adopted by the EPA. The level of volatile organic material in the recyclable material should be less than about 10.0 mg/L.

Prior to treatment according to the invention, the wipes described above are considered a hazardous waste material because the wipes contain sufficient organic fluids such as alcohols which are flammable or ignitable. Methods of evaporating the organic fluids from the wipes are slow, often requiring a large investment in heat generating equipment and are not readily portable to a site for treating waste materials. Accordingly, the waste materials must be transported off-site as a hazardous waste for treatment. The invention enables the waste materials to be treated on-site to remove the hazardous characteristics therefrom so that the material may be moved off-site to a recycling plant without being classified as a hazardous waste.

Figure 5:
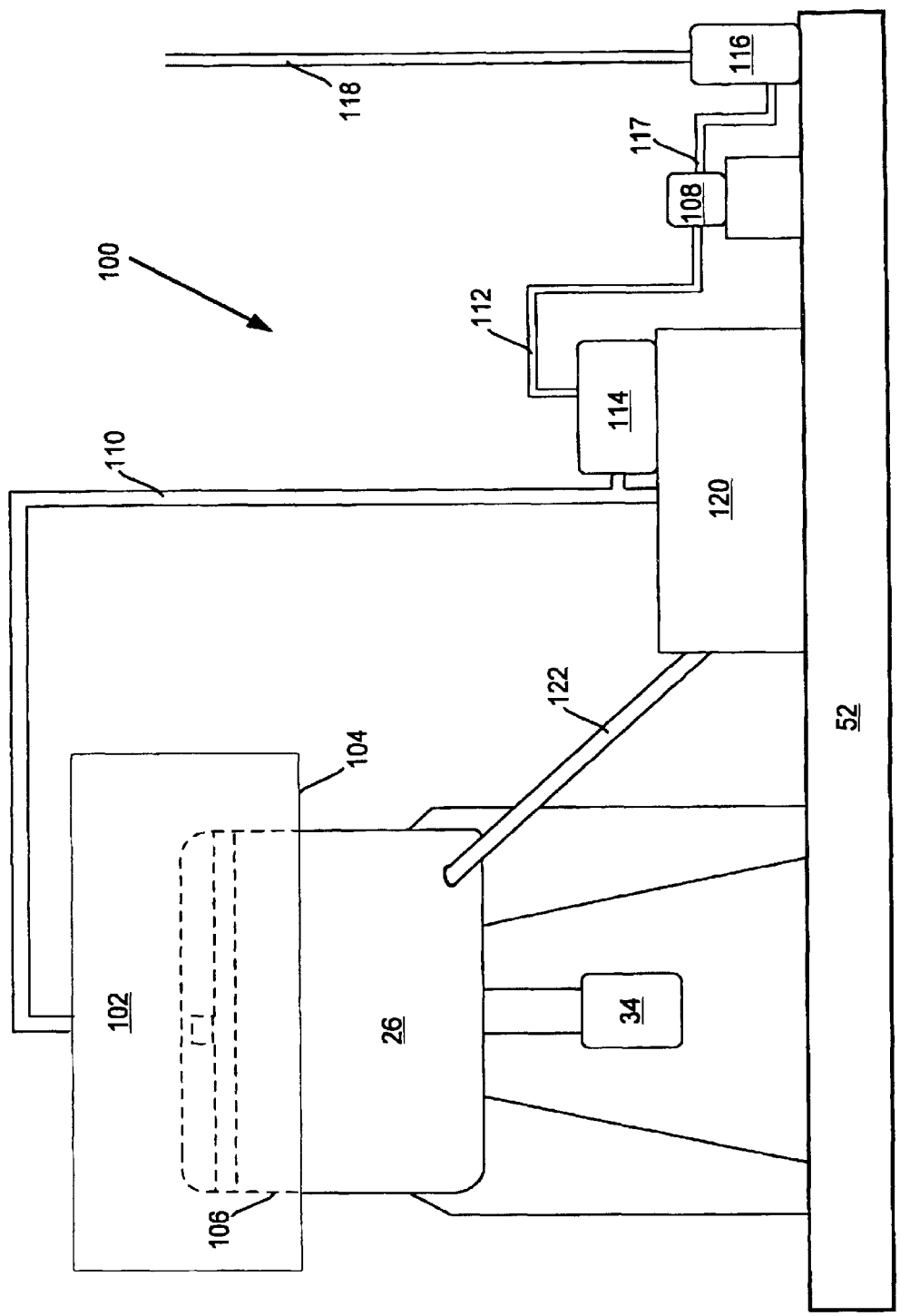
FIG. 5 is a schematic view of a treatment system according to another embodiment of the invention.

The system 100 is illustrated in schematically in FIG. 5 and preferably includes a centrifuge 26, preferably a self-balancing centrifuge as described above with reference to FIGS. 1 and 3. The centrifuge 26, including a drive unit 34 and drive shaft 33 is mounted on a skid 52 as described above. A fume hood 102 having an open bottom 104 is disposed over the upper portion 106 of the centrifuge 26. The fume hood 102 preferably collects volatile gases escaping from the centrifuge 26 in an amount sufficient to clean the air emissions from the centrifuge system 100 so as to qualify for air permit exemptions according to State and Federal regulations. The fume hood may also collect fugitive emissions from a fluid collection tank (described below) and from a waste materials sorting area used for removing trash and non-recyclable items form the waste materials prior to inserting the waste materials in the centrifuge.

A blower or vacuum pump 108 is provided and is connected in gas flow communication to the fume hood 102 by means of conduits 110 and 112 to move contaminated air through an optional condenser 114 and through the blower 108 and exhaust conduit 117 to an activated carbon absorption unit 116. Clean gas is discharged from the carbon absorption unit 116 by means of vent stack 118. The blower is preferably sized to move at least 400 standard cubic feet per minute (scfm) up to about 2000 scfm through the fume hood 102, conduits 110 and 112 and carbon absorption unit 116. The carbon absorption unit 116 preferably includes one 55 gallon drum of activated carbon per 100 scfm of air discharged from blower 108. A preferred activated carbon is available from Barnebey Sutcliff Corporation of Columbus, Ohio under the trade name TYPE 207C activated carbon. The activated carbon absorption unit 116 is effective to remove organic materials from the gas stream discharged in stack 118 down to an undetectible level, preferably less than about 0.1 parts per million (ppm).

Condensible components of the air and gas stream collected by fume hood 102 are condensed in an optional chilled water or cryogenic fluid condenser 114 and the liquid components from the condensation flow into condensate collection tank 120. Also any organic fluids removed from the pads by centrifuge 26 flow through liquid conduit 122 into the collection tank 120.

It is preferred that the entire system 100 including the blowers, motors and the like be made with explosion proof construction All electrical components and motors are preferably classified in Class II, Division 1. All controls are preferably pneumatic controls. If the system 100 is installed on a vehicle, all components of the vehicle exposed to the system are also preferably of explosion proof construction.

The system 100 provides a cost effective means for treating a large amount of hazardous waste wipers in a relatively short period of time. For example, 100 pounds of alcohol wipes containing from about 100 to about 150 pounds of liquids were inserted in centrifuge 26 and centrifuged for 5 minutes. At the end of 3 minutes, the wipes contained only about 5 weight percent liquids. Centrifuging times ranging from about 4 to about 6 minutes have been found to be sufficient to remove sufficient fluid from the wipes so that the wipes pass the Paint Filter Test and flammability tests described above.

After treating the wipes in the centrifuge system 100 described above,the wipes are no longer considered a hazardous waste and may be removed from the waste generation site. Further treatment of the wipes is preferred to remove any residual odor therefrom. Such treatment may include drying the wipes at 90° F. for about 5 to about 10 minutes with air until all detectible odor is removed form the treated wipes. The wipes may then be ground, melted, recrystallized, densified and fed to an extruder along with virgin materials to provide a recycled thermoplastic material that may be used to mold thermoplastic parts.

Polypropylene wipes initially containing about 85% by weight isopropyl alcohol and 15% by weight water were collected and centrifuged for 3 minutes in the system 100 described above. The wipes (25 pounds) were removed from the system and melted in pan on a gas cooking grill. When the melted material cooled, it became a friable plastic sheet. The sheet was run through a grinder to provide ⅛ inch to ⅜ inch recycled particles. The particles were blended with virgin polypropylene in an amount of 25% by weight recycled particles and 75% by weight virgin polypropylene stock. The blend was used to mold a furniture part proving that the blended material had sufficient melt flow to be used in an injection molding machine. It will be appreciated that the recycled particles may be blended with virgin raw materials and compounding materials to meet or exceed specifications required for molded parts for a variety of industries, particularly the automotive industry.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A method for rendering waste sorbent material recyclable, the method comprising collecting polymer-based sorbent materials containing one or more solvents, treating the sorbent materials in a centrifugal treatment system for removing the solvents from the polymer-based waste material, the treatment system including a fume collection system and a centrifuge disposed in the fume collection system, the centrifuge having a housing, a housing cover and a rotatable basket received within an interior portion of the centrifuge defined by the housing and cover, the rotatable basket being configured for receiving a plurality polymer-based sorbent materials containing one or more solvents, charging the sorbent articles into the centrifuge and operating the centrifuge to rotate the basket to apply centrifugal forces to the sorbent articles for extractive removal of solvents therefrom such that the fluids travel from the basket into an annular area between the basket and the housing, providing a collection tank in flow communication with the annular area and the fume collection system, collecting solvents removed from the sorbent materials in the collection tank, and removing the thus treated sorbent materials from the centrifuge for transportation to a remote site for recycling, whereby the sorbent materials have a residual solvent content that renders the materials non-hazardous for transportation to a remote recycling site.

2. The method of claim 1 wherein the polymer-based sorbent materials comprise thermoplastic cloth.

3. The method of claim 2 wherein the thermoplastic cloth comprises polypropylene cloth containing water and a solvent selected from the group consisting of isopropyl alcohol and naphtha.

4. The method of claim 1 wherein the treated sorbent materials have a residual solvent content that enables the materials to pass a free liquids test and a flammability or ignitability test as set forth by ASTM standards or the equivalent.

5. The method of claim 1 wherein the treatment system further comprises a self contained mobile unit for transport to a remote site containing polymer-based sorbent materials to be treated.

6. The method of claim 1 further comprising grinding and melting the treated sorbent materials to provide a thermoplastic compounding material.

7. The method of claim 6 further comprising mixing the thermoplastic compounding material with from about 50 to about 75 percent by weight of virgin thermoplastic material to provide a feed material for making a recycled thermoplastic part.

8. A system for rendering polymeric sorbent articles non-hazardous comprising a centrifuge treatment system including a fume collection system having a fume hood and a centrifuge disposed in the fume hood of the fume collection system, the centrifuge having a housing, a housing cover and a rotatable basket received within an interior portion of the centrifuge defined by the housing and cover, the rotatable basket being configured for receiving a plurality polymer sorbent articles containing one or more solvents and for extractive removal of solvents therefrom by rotation of the basket during use of the system so that extractive forces are applied to the sorbent articles and fluids extracted from the sorbent articles travel from the basket into an annular area between the basket and the housing, a collection tank in flow communication with the annular area for receiving solvents removed from the sorbent materials.

9. The system of claim 8 wherein the centrifuge treatment system includes a self-balancing centrifuge.

10. The system of claim 9 wherein the centrifuge system is mounted on a vehicle for transport to a remote site.

11. The system of claim 8 wherein the centrifuge system is mounted on a vehicle for transport to a remote site.

12. The system of claim 8 wherein the centrifuge system is fixedly attached to a vehicle.

13. The system of claim 8 further comprising a wheeled cart releasably mountable on a vehicle wherein the centrifuge system is fixedly mounted to a wheeled cart.

14. The system of claim 8 further comprising a condenser for removing condensible components from the fume collection system and collection tank.

\* \* \* \* \*